(12) United States Patent
Paillard et al.

(10) Patent No.: US 9,328,676 B2
(45) Date of Patent: May 3, 2016

(54) SUPERCHARGED ENGINE DIAGNOSTICS METHOD AND ASSOCIATED ENGINE

(71) Applicant: RENAULT s.a.s., Boulogne-Billancourt (FR)

(72) Inventors: Jerome Paillard, Mereville (FR); Vincent-Pierre Avons, Paris (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 14/651,902

(22) PCT Filed: Dec. 12, 2013

(86) PCT No.: PCT/EP2013/076309
§ 371 (c)(1),
(2) Date: Jun. 12, 2015

(87) PCT Pub. No.: WO2014/095544
PCT Pub. Date: Jun. 26, 2014

(65) Prior Publication Data
US 2015/0322876 A1 Nov. 12, 2015

(30) Foreign Application Priority Data

Dec. 20, 2012 (FR) ...................................... 12 62453

(51) Int. Cl.
*G01M 15/04* (2006.01)
*F02D 41/00* (2006.01)
(Continued)

(52) U.S. Cl.
CPC ............ *F02D 41/0007* (2013.01); *F02B 37/12* (2013.01); *F02B 37/18* (2013.01); *F02B 37/225* (2013.01); *F02B 2039/166* (2013.01); *Y02T 10/144* (2013.01)

(58) Field of Classification Search
CPC ...................................................... G01M 15/04
USPC .............................. 73/114.37, 114.76, 114.77
See application file for complete search history.

(56) References Cited

U.S. PATENT DOCUMENTS 4,672,814 A    6/1987 Abo et al.
5,186,081 A *  2/1993 Richardson et al. ............ 477/33
(Continued)

FOREIGN PATENT DOCUMENTS

EP    1 310 652    5/2003
EP    2 314 847    4/2011
(Continued)

OTHER PUBLICATIONS

International Search Report Issued Jan. 27, 2014 in PCT/EP13/076309 Filed Dec. 12, 2013.
(Continued)

*Primary Examiner* — Eric S McCall
(74) *Attorney, Agent, or Firm* — Oblon, McClelland, Maier & Neustadt, L.L.P

(57) ABSTRACT

A diagnostics method for a supercharged internal combustion engine including a fixed-geometry turbocharger, including a compressor through which air admitted into an intake circuit passes, and a turbine rotationally connected to the compressor and through which exhaust gases pass, the method including: calculating a first integral with respect to time of a measurement of atmospheric pressure; calculating an integral with respect to time of a measurement of boost pressure; calculating a second integral with respect to time of a measurement of atmospheric pressure; calculating two diagnostics criteria dependent on the first integral of atmospheric pressure, on the integral of the boost pressure and on the second integral of the atmospheric pressure; comparing the first diagnostics criterion with a first diagnostics threshold and comparing the second diagnostics criterion with a second diagnostics threshold; and diagnosing a fault when at least one of the diagnostics criteria is below its associated diagnostics threshold.

12 Claims, 2 Drawing Sheets

(51) Int. Cl.
  *F02B 37/22* (2006.01)
  *F02B 37/12* (2006.01)
  *F02B 37/18* (2006.01)
  *F02B 39/16* (2006.01)

(56) References Cited

U.S. PATENT DOCUMENTS

2003/0033889 A1* 2/2003 Schmid et al. ............ 73/862.27
2011/0036333 A1* 2/2011 Fontvieille et al. ........... 123/564
2011/0088390 A1  4/2011 Panciroli et al.
2012/0222417 A1* 9/2012 Fontvieille et al. ............ 60/602
2015/0143882 A1* 5/2015 Nakano et al. ............. 73/112.05
2015/0275791 A1* 10/2015 Yasui et al. .................. 701/102

FOREIGN PATENT DOCUMENTS

FR  2 944 055   10/2010
WO  02 29229    4/2002

OTHER PUBLICATIONS

French Search Report Issued Oct. 22, 2013 in French Application 1262453 Filed Dec. 20, 2012.

* cited by examiner

SUPERCHARGED ENGINE DIAGNOSTICS METHOD AND ASSOCIATED ENGINE

TECHNICAL FIELD OF THE INVENTION

The invention relates to an onboard diagnostics method for a supercharged internal combustion engine, notably of a motor vehicle equipped with a fixed-geometry turbocharger and with a wastegate valve. It also relates to an engine suited to the implementation of such a method.

PRIOR ART

Supercharging makes it possible to increase engine performance by admitting, in order to burn the fuel, a mass fire rate of air that is higher than in a naturally aspirated engine of equivalent cylinder capacity. A device for supercharging an engine may for example comprise a turbocharger comprising, on the one hand, a compressor which supplies the engine with air at a pressure higher than atmospheric pressure and, on the other hand a turbine through which all or some of the exhaust gases from the engine pass. The power supplied to the turbine by the expansion of the gases passing through the turbine is transmitted, via a shaft to the compressor which compresses the air aspirated from the external atmosphere to a pressure referred to as the boost pressure.

Numerous engines, notably gasoline engines, are fitted with a fixed-geometry turbocharger (also known by the acronym FGT), which means to say one in which the turbine has non-orientable blades. The turbine of the turbocharger is associated with a valve that discharges to the exhaust, also referred to as a wastegate valve, the degree of openness of which makes it possible to regulate the proportion of engine exhaust gases passing through the turbine and thus alter the power that the turbine draws from the exhaust gases and thereby adjusting the boost pressure.

Various diagnostics methods aimed at evaluating the boost function in an engine, for example a motor vehicle engine, so as to limit engine performance and/or alert the driver to the need to make repairs or to the fact that a legal level of pollutant emissions has been exceeded as a result of a lack of compression are known from the prior art. For example, publication FR-B1-2923262 discloses a method for detecting a fault in an air supercharging device, which is based on continuous measurement of the pressure of the gases upstream of a turbine and consists in:

checking that the engine is in a controlled state in which the turbocharger is controlled on the basis of the pressure ahead of the turbine $P_{avt}$;
periodically measuring this pressure ahead of the turbine $P_{avt}$;
for each measurement, calculating a value $\Delta P_{avt} = P_{avt} - P_{avt\_}$, in which $P_{avt\_}$ is a set value of the pressure ahead of the turbine;
if $\Delta P_{avt}$ is greater than or equal to zero, subtracting from it a predetermined value referred to as "dead band" BM and keeping positive values, and if not replacing it by zero;
calculating an integral with respect to time I of the pressure loop difference using the equation $I = \int |P_{avt} - P_{avt\_}| * dt$;
if I is above a predetermined threshold, diagnosing a state of defectiveness.

However, the known diagnostics methods lack precision. Most can be used only when the boost pressure is being regulated in closed-loop control by the opening of a wastegate valve in order to conform to a torque setpoint demanded by the driver. However, such closed-loop control is not always used; in particular, the area of engine speed—load operating points during the NEDC European Homologation Cycle in which the pollutant emissions of the engine of a motor vehicle are calculated essentially covers an area of operating points in which the supercharging is rather regulated using open-loop control. The known methods, for example the method described hereinabove, are unable to meet the requirements of the European Standard referred to as "euro6 OBD" which requires every vehicle to have supercharging diagnostics on the NEDC cycle.

SUMMARY OF THE INVENTION

The invention proposes to overcome the deficiencies of the known diagnostics methods. To do so it proposes a diagnostics method for a supercharged internal combustion engine equipped with a fixed-geometry turbocharger comprising a compressor through which the air admitted to the intake circuit of the engine passes, and a turbine rotationally connected to the compressor by a common shaft and through which exhaust gases from the engine pass in the exhaust circuit of the engine, said engine being associated with:
    a throttle valve for varying the bore section for the air admitted to the intake circuit of the engine; and
    a wastegate valve mounted in parallel with the turbine in the exhaust circuit of the engine in order to vary the proportion of exhaust gases from the engine passing through the turbine,
characterized in that it comprises:
    a step of calculating a first integral with respect to time of a measurement of the atmospheric pressure during a calculation time;
    a step of calculating an integral with respect to time of a measurement of the boost pressure during said calculation time;
    a step of calculating a second integral with respect to time of a measurement of the atmospheric pressure during said calculation time;
    a step of calculating two diagnostics criteria dependent on the first integral with respect to time of the atmospheric pressure, on the integral with respect to time of the boost pressure and on the second integral with respect to time of the atmospheric pressure;
    a step of comparing the first diagnostics criterion with a first diagnostics threshold and of comparing the second diagnostics criterion with a second diagnostics threshold; and
    a step of diagnosing a fault when one of the two diagnostics criteria at least is below its associated diagnostics threshold.

BRIEF DESCRIPTION OF THE DRAWINGS

Other features and advantages of the invention will become apparent from reading one non-limiting embodiment thereof, with reference to the attached drawing in which.

DETAILED DESCRIPTION OF THE FIGURES

Figure 1:
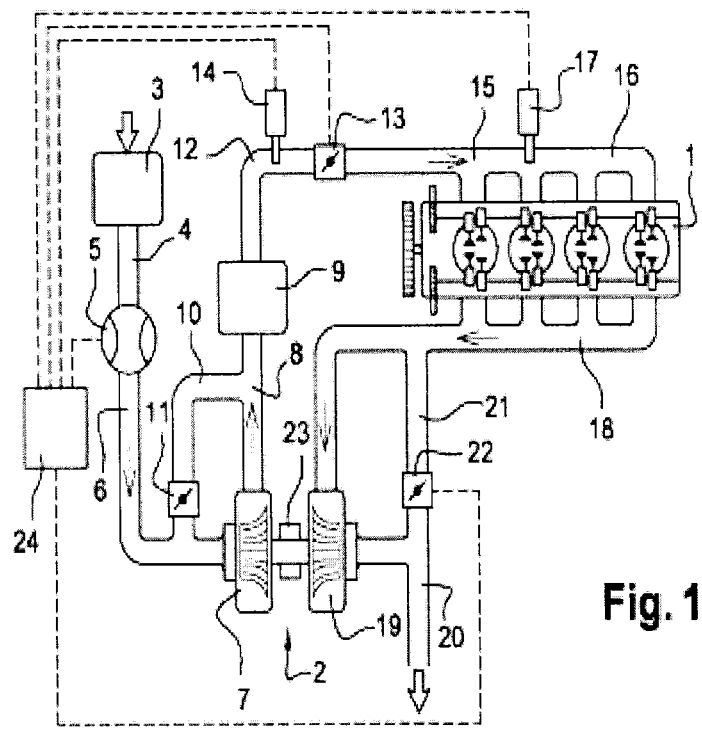
FIG. 1 is a schematic depiction of an internal combustion engine suited to implementation of the method according to the invention.

FIG. 1 schematically depicts an internal combustion engine 1 mounted for example on a motor vehicle (not depicted), fitted with a fixed-geometry turbocharger 2 associated with a certain number of components that make up the air intake circuit of the engine 1 and the exhaust circuit exhausting the burnt gases from the engine 1.

The air intake circuit comprises an air filter 3, a first air pipe 4 referred to as the filter—flow meter connecting pipe, which connects the air filter 3 to a flow meter 5 which measures the mass flow rate Q of air aspirated from the external atmosphere. A second air pipe 6, referred to as the flow meter—turbocharger connecting pipe, connects the flow meter 5 to the inlet of the compressor 7 of the turbocharger 2. The outlet from the compressor 7 is connected to one end of the third pipe 8, referred to as the turbocharger—cooler connecting pipe. The other end of this third pipe 8 is connected to the inlet of a charge air cooler 9, also known by the acronym CAC (from the leading capitals of the expression: Charge Air Cooler). A pipe discharged into the intake 10, on which there is mounted a valve 11 discharged into the intake and also referred to as a pop-off valve 11, is mounted in parallel with the compressor 7. More specifically, one of its ends starts in the second pipe 6 and the other end opens into the third pipe 8.

A fourth pipe 12, referred to as the CAC—throttle connecting pipe connects the CAC 9 to the inlet of a throttle valve 13. It is fitted with a boost pressure sensor 14 capable of measuring the boost pressure $P_{boost}$ of the air. The outlet of the throttle valve is connected to one end of a fifth pipe 15, referred to as the throttle valve—engine connecting pipe, the other end of which is connected to an intake manifold 16 of the engine 1. The intake manifold 16 is fitted with an air pressure sensor 17 able to measure the pressure of the air in the intake manifold $P_{man}$, namely the pressure of the air entering the engine 1.

In the conventional way, the engine 1 comprises a cylinder block delimiting a plurality of cylinders (four in FIG. 1), a cylinder head delimiting a plurality of combustion chambers which are associated with an intake duct, with at least one intake valve, with fuel-injection means, for example a gasoline injector, with at least one exhaust valve and with an exhaust duct for exhausting the burnt gases.

The exhaust circuit exhausting the burnt gases from the engine 1 comprises an exhaust manifold 18 which connects the outlet of the engine 1 to the inlet of the turbine 19 of the turbocharger 2. The outlet of the turbine 19 is connected to one end of a pipe 20 for exhausting the burnt gases which may comprise various devices for treating the pollutant emissions of the engine exhaust gases (these have not been depicted in FIG. 1).

A wastegate pipe 21, on which a wastegate valve 22 is mounted is mounted, in parallel with the turbine 19 in the exhaust circuit of the engine 1. More specifically, one of its ends starts at the outlet of the exhaust manifold 18 and the other end opens into the exhaust pipe 20.

The turbocharger 2, which in this instance is a fixed-geometry turbocharger, which means to say has turbine blades 19 of fixed orientation, comprises the compressor 7 which forms part of the air intake circuit of the engine 1, and the turbine 19, which forms part of the exhaust circuit of the engine 1. The turbocharger 2 comprises a shaft 23 to which the compressor 7 and the turbine 19 are rotationally connected.

The turbocharger is associated, in the intake circuit of the engine 1, with the pop-off valve 11 and the wastegate valve 22. These two valves 11, 22 are advantageously assembled on the turbocharger 2.

In a way known per se, the mode of operation of the engine 1 is as follows: air from outside the vehicle, at atmospheric pressure $P_{atmo}$ passes through the intake circuit of the engine 1 in the direction of the arrows. It is filtered in the air filter 3 then the air mass flow rate Q is measured by the flow meter 5.

In an alternative that has not been depicted, without departing from the scope of the invention, the air mass flow rate Q may also be determined as being equal to the difference between the mass flow rate of the exhaust gases $Q_{exh}$ (measured by a flow meter on the exhaust) and the mass flow rate of fuel $Q_{fuel}$ injected into the engine for burning in the cylinders of the engine 1, through a principle of conservation of mass. It may also be determined by a map of the engine 1, for example as a function of the collection of parameters comprising at least the air pressure in the intake manifold $P_{man}$, the engine speed N and a value indicative of the openness α of the throttle valve 13, in which case no flow meter 5 is needed for determining the air mass flow rate Q.

The air is compressed by the compressor 7. It is assumed here and throughout the description that the pop-off valve 11 is completely closed, namely that all of the air passing through the compressor 7 then enters the CAC 9. The compressed air is then cooled in the CAC then admitted to the combustion chambers of the engine 1 via the intake manifold 16.

Depending on the speed N and on a torque setpoint C indicating the need for engine torque, notably associated with the degree to which the throttle pedal (not depicted) of the vehicle has been depressed by the driver and with various actuators (not depicted) such as an air conditioning compressor or an alternator of the engine 1, an engine processor 24, which is connected to a collection of sensors and actuators comprising at least:

the flow meter 5;
the throttle valve 13;
the boost pressure sensor 14;
the sensor 17 that senses the air pressure in the intake manifold 16; and
the wastegate valve 22, determines, on the one hand, a mass flow rate of air Q and, on the other hand, a mass flow rate of fuel $Q_{fuel}$ to be injected into the engine 1, which may usually be in stoichiometric proportions in the case of a gasoline engine 1.

The air mass flow rate Q is converted into a setpoint of openness α of the throttle valve 13 and into an intake manifold pressure setpoint $P_{man}$. In theory, a given air mass flow rate Q (measured in kg/s) can be obtained by different choices of setpoint for the openness α of the throttle valve 13 and setpoint of openness of the wastegate valve 22: The first setpoint makes it possible to regulate the bore section for the passage of air admitted to the intake circuit, namely to alter the volumetric flow rate (measured in m³/s) thereof. The second setpoint makes it possible to regulate the proportion of exhaust gases from the engine 1 passing through the turbine, by allowing some of the exhaust gases of the engine 1 to bypass the turbine via the wastegate valve 22 which is mounted in parallel with the turbine 19 in the exhaust circuit of the engine 1. The power drawn by the turbine 19 from the exhaust gases is thus modulated making it possible to adjust the boost pressure $P_{boost}$, namely to influence the density (measured in kg/m³) of the air admitted.

Figure 2:
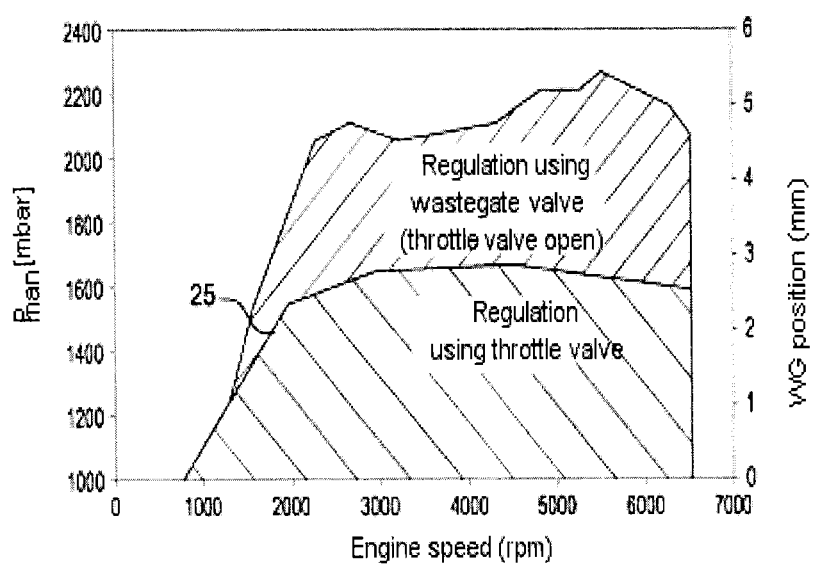
FIG. 2 illustrates various ways of regulating the supercharging in an engine according to the engine speed and the air pressure in an intake manifold of the engine.

In order to simplify the control of the engine 1, the intake manifold air pressure $P_{man}$ is regulated by acting on just one actuator at a time out of the throttle valve 13 and the wastegate valve 22, as illustrated in FIG. 2.

FIG. 2 depicts two ways of regulating the intake manifold pressure $P_{man}$. The abscissa axis represents the rotational speed N of the engine and the ordinate axis represents the air pressure obtaining in the intake manifold $P_{man}$ as measured by the air pressure sensor 17.

For relatively low requirements of engine 1 torque C, namely for intake manifold pressure $P_{man}$ values that are not very high, below a pressure threshold which is dependent on the speed N represented by the curve 25, the engine is in a boost regulation mode referred to as "natural boost" which corresponds to the following two conditions:

The wastegate valve 22 is completely closed, which means to say that all of the exhaust gas flow $Q_{exh}$ leaving the engine 1 passes through the turbine 19 and supplies the latter with expansion energy which is transmitted to the compressor 2 by the shaft 23 to compress the air flow rate Q.

The intake manifold air pressure $P_{man}$ is regulated by open-loop control to a pressure setpoint by the processor 24, by altering the degree of openness α of the throttle valve 13. The boost pressure $P_{boost}$ is not regulated directly but is the result of the openness α of the throttle valve 13 and of the intake manifold air pressure $P_{man}$.

For relatively high requirements of engine 1 torque C, namely for high intake manifold pressure $P_{man}$ values above the pressure threshold dependent on the speed N which is represented by the curve 25, the engine is in what is referred to as a "closed-loop control" mode of regulating the boost.

The throttle valve 13 is wide open, which means to say that the bore section and the volumetric flow rate of the admitted air are at their maximum. The intake manifold air pressure $P_{man}$ coincides with the boost pressure $P_{boost}$. The intake manifold air pressure $P_{man}$ is regulated in closed-loop control to a pressure setpoint by the processor 24 by altering the openness of the wastegate valve 22.

Figure 3:
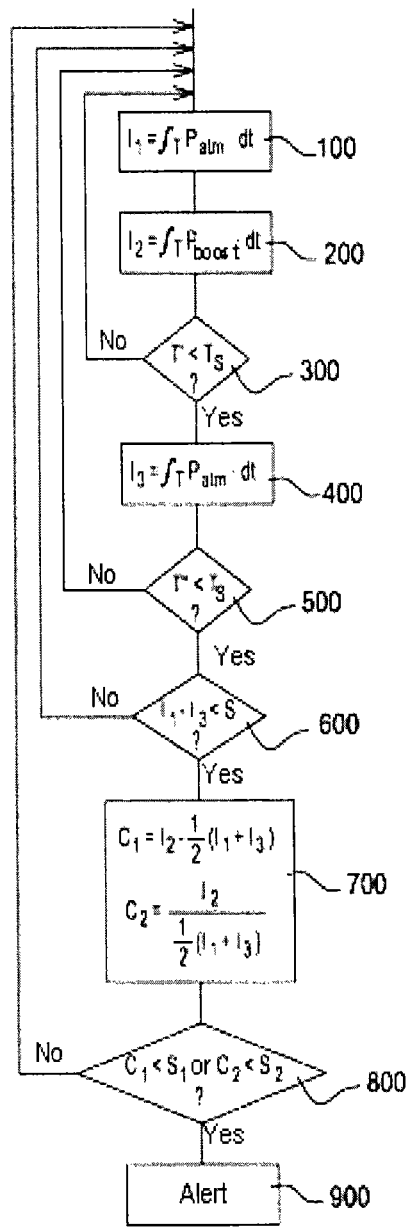
FIG. 3 is a schematic depiction of the steps of the diagnostics method for a supercharged engine according to the invention.

FIG. 3 depicts the steps of the diagnostics method for a supercharged engine 1 according to the invention.

The method comprises a step 100 of calculating a first interval with respect to time $I_1$ of the atmospheric pressure $P_{atm}$ during a calculation time T, using the equation:

$$I_1 = \int_T P_{atm} * dt$$

This step 100 begins when the processor 24 determines that the air mass flow rate Q (measured by the flow meter 5) is below a first flow rate threshold $Q_1$, below which the turbocharger 2 is practically unable to compress the admitted air, as the energy given up by the exhaust gasses to the turbine 19 is negligible. The atmospheric pressure $P_{atm}$ is approximated to the boost pressure $P_{boost}$, pressure drops in the engine intake circuit, particularly in the air filter 3 and the charge air cooler 9 being negligible. The atmospheric pressure $P_{atm}$ is thus advantageously determined by the boost pressure sensor 14.

The integrating of the atmospheric pressure $P_{atm}$ continues as long as the air mass flow rate Q remains constantly below the first flow rate threshold $Q_1$. If at some point in the calculation of the first integral $I_1$, the air mass flow rate Q exceeds the first threshold $Q_1$, this calculation is immediately interrupted and the method resumes from the start of step 100. If not, calculation of the first integral $I_1$ continues until the end of the calculation time T, and step 100 ends when this calculation has been completed, namely when it has come to its end uninterrupted.

At the end of step 100, the method continues with a step 200 of calculating an integral with respect to time $I_2$ of the boost pressure $P_{boost}$ in natural boost mode, for the same length of calculation time T as the first integral with respect to time $I_1$ of the atmospheric pressure, using the equation:

$$I_2 = \int_T P_{boost} * dt$$

This step 200 begins when the processor 24 determines that the boost is entering the natural boost mode (described in FIG. 2) without the possibility of neglecting the compression of the air. That happens when the following two conditions are simultaneously met:

$1^{st}$ condition: the air mass flow rate Q (measured by the flow meter 5) is above a second flow rate threshold $Q_2$ strictly higher than the first flow rate threshold $Q_1$; and $2^{nd}$ condition: the intake manifold air pressure $P_{man}$ (measured by the pressure sensor 17) is below a pressure threshold dependent on the engine speed N (corresponding to the curve 25 in FIG. 2).

The integrating of the boost pressure $P_{boost}$ continues as long as the $1^{st}$ and $2^{nd}$ conditions above are met. If at some time in the calculation of the integral $I_2$ of the boost pressure at least one of the two conditions is no longer met, this calculation is immediately interrupted and the method resumes from the start of step 200. If not, the calculation of the interval $I_2$ of boost pressure continues until the end of the calculation time T. Step 200 ends when this calculation has been completed, namely when it has reached its end uninterrupted.

The diagnostics method continues with a first test step 300 during which the processor determines the time T' separating the end of the calculation of the first integral of atmospheric pressure $I_1$ that has been completed, from the start of the calculation of the integral of boost pressure $I_2$ that has been completed.

If this time T' is above a duration threshold $T_s$, the first test step 300 causes the diagnostics method to resume from the start of step 100. If not, the method continues with a step 400 of calculating a second integral with respect to time $I_3$ of atmospheric pressure $P_{atm}$, during the calculation time T, according to the equation:

$$I_3 = \int_T P_{atm} * dt$$

As with step 100, this step 400 begins when the processor 24 determines that the air mass flow rate Q (measured by the flow meter 5) is below the first flow rate threshold $Q_1$, below which the turbocharger 2 is practically unable to compress the admitted air, as the energy given up by the exhaust gases to the turbine 19 is neglible. The atmospheric pressure $P_{atm}$ is once again approximated to the boost pressure $P_{boost}$ and determined by the boost pressure sensor 14.

The integrating of the atmospheric pressure $P_{atm}$ continues as long as the air mass flow rate Q remains constantly below the first flow rate threshold $Q_1$. If at some moment in the calculation of the second interval $I_3$ the air mass flow rate Q exceeds the first threshold $Q_1$, this calculation is immediately interrupted and the method resumes from the start of step 400. If not, the calculation of the second integral $I_3$ continues to the end of the calculation time T, and the step 400 ends when this calculation has been completed, namely when it has reached its end uninterrupted.

The diagnostics method continues with a second test step 500 during which the processor determines the time T'' separating the end of the calculation of the integral of boost pressure $I_2$ which has been completed from the start of the calculation of the second integral of atmospheric pressure $I_3$ that has been completed.

If this time T'' is above a duration threshold $T_s$, the second test step 500 causes the diagnostics method to resume from the start of step 100. If not, the method continues with a third test step 600 during which the first and second integrals of atmospheric pressure $I_3$ are compared with one another. The purpose of this step 600 is to make sure that the external conditions under which the diagnostics method is being run are remaining roughly constant over the entire duration of the method, so as not to skew the result. For example, the altitude must not vary too rapidly, this notably excluding scenarios in which the vehicle is driving on a steep mountain slope.

In step 600, the difference between the first integral of atmospheric pressure $I_1$ and the second integral of atmospheric pressure $I_3$ is compared against a difference threshold S. If this difference is above the difference threshold S, the method resumes from the start of step 100. If not, the method continues with a step 700 of calculating two diagnostics criteria $C_1$, $C_2$.

The first diagnostics criterion $C_1$ is equal to the difference between:
- the integral with respect to time of boost pressure $I_2$; and
- the arithmetic mean of the first and second integrals with respect to time of atmospheric pressure $I_1$, $I_3$ according to the equation:

$$C_1 = I_2 - \tfrac{1}{2}(I_1 + I_3)$$

The second diagnostics criterion $C_2$ is equal to the ratio of:
- the integral with respect to time of boost pressure $I_2$ divided by
- the arithmetic mean of the first and second integrals with respect to time of atmospheric pressure $I_1$, $I_3$ according to the equation:

$$C_2 = I_2 / [\tfrac{1}{2}(I_1 + I_3)]$$

The diagnostics method continues with a diagnostics step 800 in which the first diagnostics criterion $C_1$ is compared with a first diagnostics threshold $S_1$ and the second diagnostics criterion $C_2$ is compared with a second diagnostics threshold $S_2$.

If one of the two criteria $C_1$, $C_2$ at least is below the corresponding diagnostics threshold $S_1$, $S_2$, the diagnostics step 800 directs the method toward a fault diagnostics step 900, namely an alert step 900 in which the driver of the vehicle is alerted to the defectiveness of the boost, for example through the illuminating of an indicator lamp on the vehicle instrument panel.

If not, no alert is transmitted and the diagnostics method resumes from the start of step 100. This then is an onboard diagnostics method which operates continuously, and when the engine 1 is in natural control mode.

For example, the time T spent calculating the integrals $I_1$, $I_2$, $I_3$ of atmospheric pressure and boost pressure is substantially equal to 3 seconds, and the duration threshold $T_s$ for the time between the calculations of the various integrals $I_1$, $I_2$, $I_3$ is less than 10 seconds.

Advantageously, the difference threshold S for the integral of atmospheric pressure is less than 60 mbar*s when the time T spent calculating the integrals is equal to 3 seconds, which means to say that on average, over a calculation time of 3 seconds, the atmospheric pressure $P_{atm}$ does not vary by more than 20 millibar between steps 100 and 400 of the diagnostics method.

Advantageously, the first diagnostics threshold $S_1$ is between 100 and 150 mbar*s, and the second disgnostics threshold S2 is between 1.02 and 1.06, for a time T spent calculating the integrals of 3 seconds, and for an atmospheric pressure that is substantially constant and equal to 1013 mbar, namely equal to the normal pressure at sea level. These thresholds may be indexed to the altitude, which means to say to the atmospheric-pressure value measured for example at the start of method step 100, and stored in the form of a map in a memory of the processor 24.

The flow rate thresholds $Q_1$, $Q_2$ may be predetermined experimentally. They are dependent on the type of engine 1 and turbocharger 2. Notably, the higher the cylinder capacity of the engine 1 and the greater the inertia of the turbocharger 2, the higher their values will need to be.

The diagnostics method according to the invention offers numerous advantages. Unlike the known methods, it allows the functioning of the supercharging of an engine 1 to be diagnosed when the engine is being naturally supercharged, namely outside of the mode in which the supercharging is regulated in closed-loop control (using the wastegate valve 22).

Furthermore, its precision is very good because all the measurements of atmospheric pressure $P_{atm}$ and boost pressure $P_{boost}$ are made by a single boost pressure sensor 14, which makes it possible to get around problems of measurement spread between sensors, and because also steps are taken to ensure that the external conditions under which the diagnostics method is run, notably the altitude, remain substantially constant.

The invention claimed is:

1. A diagnostics method for a supercharged internal combustion engine including a fixed-geometry turbocharger including a compressor through which air admitted to an intake circuit of the engine passes, and a turbine rotationally connected to the compressor by a common shaft and through which exhaust gases from the engine pass in an exhaust circuit of the engine, the engine being associated with:
   a throttle valve for varying a bore section for air admitted to the intake circuit of the engine; and
   a wastegate valve mounted in parallel with the turbine in the exhaust circuit of the engine to vary a proportion of exhaust gases from the engine passing through the turbine, the method comprising:
   calculating a first integral with respect to time of a measurement of atmospheric pressure during a calculation time;
   calculating an integral with respect to time of a measurement of the boost pressure during the calculation time;
   calculating a second integral with respect to time of a measurement of the atmospheric pressure during the calculation time;
   calculating two diagnostics criteria dependent on the first integral with respect to time of the atmospheric pressure, on the integral with respect to time of the boost pressure, and on the second integral with respect to time of the atmospheric pressure;
   comparing the first diagnostics criterion with a first diagnostics threshold and comparing the second diagnostics criterion with a second diagnostics threshold; and
   diagnosing a fault when one of the two diagnostics criteria at least is below its associated diagnostics threshold.

2. The method as claimed in claim 1, wherein the atmospheric pressure for calculating the first and second integral with respect to time of the atmospheric pressure is measured by a boost pressure sensor installed in the intake circuit of the engine downstream of the compressor.

3. The method as claimed in claim 1, wherein during a time spent calculating the first and second integral with respect to time of the atmospheric pressure, mass flow rate of air admitted is below a first flow rate threshold.

4. The method as claimed in claim 1, wherein the boost pressure for calculating the integral with respect to time of the boost pressure is measured by a same sensor as the atmospheric pressure for calculating the first and second integral with respect to time of the atmospheric pressure.

5. The method as claimed in claim 1, wherein during a time spent calculating the integral with respect to time of the boost pressure, mass flow rate of air admitted is above a second flow rate threshold higher than the first flow rate threshold.

6. The method as claimed in claim 1, wherein the calculating the first integral with respect to time of the atmospheric pressure precedes the calculating the integral with respect to time of the boost pressure, and the calculating the integral with respect to time of the boost pressure precedes the calculating the second integral with respect to time of the atmospheric pressure.

7. The method as claimed in claim 1, wherein the two diagnostics criteria are calculated if the difference between the first integral of atmospheric pressure and the second integral of atmospheric pressure is below a difference threshold.

8. The method as claimed in claim 1, wherein the first diagnostics criterion is calculated as being equal to the difference between:
- the integral with respect to time of boost pressure, and
- the arithmetic mean of the first and second integrals with respect to time of atmospheric pressure.

9. The method as claimed in claim 1, wherein the second diagnostics criterion is equal to the ratio of:
- the integral with respect to time of boost pressure divided by
- the arithmetic mean of the first and second integrals with respect to time of atmospheric pressure.

10. A supercharged internal combustion engine comprising:
- a fixed-geometry turbocharger comprising a compressor through which air admitted to an intake circuit of the engine passes; and
- a turbine rotationally connected to the compressor by a common shaft and through which exhaust gases from the engine pass, in an exhaust circuit of the engine, for implementing the method as claimed in claim 1, associated with:
- a throttle valve for varying the bore section for the air admitted to the intake circuit of the engine; and
- a wastegate valve mounted in parallel with the turbine in the exhaust circuit of the engine to vary the proportion of exhaust gases from the engine passing through the turbine.

11. The method as claimed in claim 1, wherein during a time spent calculating the integral with respect to time of the boost pressure, pressure of air in an intake manifold of the engine is below a threshold dependent on speed of the engine.

12. The method as claimed in claim 11, wherein during the time spent calculating the integral with respect to time of the boost pressure, the intake manifold pressure is regulated by open-loop control using openness of the throttle valve and in which the wastegate valve is closed.

* * * * *